United States Patent
Ishiwata et al.

(10) Patent No.: US 10,701,693 B2
(45) Date of Patent: Jun. 30, 2020

(54) BIAS T CIRCUIT

(71) Applicant: MURATA MANUFACTURING CO., LTD., Kyoto-fu (JP)

(72) Inventors: Yu Ishiwata, Nagaokakyo (JP); Yoshihiro Imanishi, Nagaokakyo (JP); Kiyomi Ikemoto, Nagaokakyo (JP); Kota Takayama, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 45 days.

(21) Appl. No.: 15/668,897

(22) Filed: Aug. 4, 2017

(65) Prior Publication Data

US 2018/0098324 A1 Apr. 5, 2018

(30) Foreign Application Priority Data

Oct. 4, 2016 (JP) .................. 2016-196169

(51) Int. Cl.
*H04B 15/00* (2006.01)
*H04W 72/04* (2009.01)
*H04W 84/12* (2009.01)

(52) U.S. Cl.
CPC ........ *H04W 72/0453* (2013.01); *H04B 15/00* (2013.01); *H04W 84/12* (2013.01)

(58) Field of Classification Search
CPC ... H04W 72/0453; H04W 84/12; H04B 15/00
See application file for complete search history.

(56) References Cited

U.S. PATENT DOCUMENTS

| | | | |
|---|---|---|---|
| 6,639,461 B1* | 10/2003 | Tam ........................ | H03F 3/602 330/10 |
| 2006/0022771 A1* | 2/2006 | Ji .......................... | H01F 27/027 333/185 |
| 2016/0127051 A1* | 5/2016 | Petrovic ................. | H04H 40/90 455/63.1 |
| 2016/0336983 A1* | 11/2016 | Wang ..................... | H04B 1/1027 |
| 2018/0035289 A1* | 2/2018 | Shulman ............... | H04W 12/06 |

FOREIGN PATENT DOCUMENTS

| | | |
|---|---|---|
| JP | H04-129308 A | 4/1992 |
| JP | 2010-232988 A | 10/2010 |
| JP | 2011-082809 A | 4/2011 |

\* cited by examiner

*Primary Examiner* — Michael Thier
*Assistant Examiner* — Brian P Cox
(74) *Attorney, Agent, or Firm* — Studebaker & Brackett PC (57) ABSTRACT

An electronic apparatus includes a radio communication unit employing a WiGig method and a radio communication unit employing a Wi-Fi method. A bias T circuit is included in the radio communication unit employing the WiGig method. The bias T circuit includes inductors and a filter. The inductors are disposed between a signal line and a DC-DC converter, and are connected in series to each other. The filter has attenuation characteristics in a frequency band used by the radio communication unit employing the Wi-Fi method. One end of the filter is connected between the signal line and one of the inductors located at a first stage from the signal line.

5 Claims, 4 Drawing Sheets

BIAS T CIRCUIT

CROSS REFERENCE TO RELATED APPLICATIONS

This application claims benefit of priority to Japanese Patent Application 2016-196169 filed Oct. 4, 2016, the entire content of which is incorporated herein by reference.

TECHNICAL FIELD

The present disclosure relates to a bias T circuit.

BACKGROUND

For example, a bias T circuit is disposed between a signal line through which a signal passes and a power supply, and superimposes a direct-current component (a direct-current voltage or a direct current) upon the signal line. There is a bias T circuit configured to prevent a signal from entering a power supply line from a signal line, in particular, prevent a plurality of signals in different frequency bands from entering the power supply line.

For example, Japanese Unexamined Patent Application Publication No. 2010-232988 discloses a wide-band bias circuit configured to supply a direct bias current to an amplification circuit that uses a predetermined frequency band and amplifies a wide-band high-frequency signal. This wide-band bias circuit includes inductors at three or more stages connected between a power supply and at least either of nodes on input and output sides of the amplification circuit so as to achieve a high isolation from the power supply in a wide band.

Japanese Unexamined Patent Application Publication No. 2011-82809 discloses a bias circuit configured to supply a direct-current component to an alternating-current signal input into an active element such as a transistor. This bias circuit includes a bias supply terminal for supplying a direct-current component to an active element, a parallel capacitor connected between the bias supply terminal and the ground, and a parallel circuit that is connected in parallel to the parallel capacitor and has one end connected to the bias supply terminal so as to supply a direct-current component to the active element in a plurality of frequency bands at the same time. This parallel circuit includes N inductors connected between a direct-current power supply node and the bias supply terminal and (N−1) series resonators (capacitors and inductors) each connected between the ground and a node between adjacent ones of the inductors.

In current years, there are electronic apparatuses such as personal computers that perform radio communication using a plurality of different radio communication methods (for example, the Wi-Fi (registered trademark) method and the WiGig (registered trademark) method). In the Wi-Fi method, radio communication is performed using a 2.4 GHz band and/or a GHz band. In the WiGig method, radio communication is performed using a 60 GHz band. A radio communication unit employing the WiGig method (a WiGig radio communication unit) generates a 60 GHz-band signal (millimeter-wave signal) by combining signals in three different frequency bands.

In a case where an electronic apparatus includes a plurality of radio communication units employing different radio communication methods (in particular, in a case where these radio communication units are disposed close to each other), noise in a predetermined frequency band which has been caused by the radio communication unit employing one of the radio communication methods may cause the degradation in communication quality of the radio communication unit using another of the radio communication methods (may cause self-poisoning). For example, in a case where 2.4 GHz-band noise or 5 GHz-band noise occurs in a WiGig radio communication unit, the noise may adversely affect the radio communication of a radio communication unit employing the Wi-Fi method (a Wi-Fi radio communication unit) using this frequency band.

Therefore, in a case where a radio communication unit employing a certain radio communication method may cause noise in a frequency band that is used in another radio communication method, it is necessary to remove the noise in this frequency band from a signal line because the noise may be emitted from a coaxial cable. It is also necessary to prevent the noise in this frequency band from entering a power supply line from the signal line via a bias T circuit.

Japanese Unexamined Patent Application Publication No. 2010-232988 discloses a technique for preventing a plurality of high-frequency signals in different frequency bands from entering a power supply line from a signal line by adjusting the inductances of inductors connected in series in a bias circuit to increase impedances in the frequency bands of the high-frequency signals. However, since a filter or the like for removing noise in a frequency band other than the frequency bands of the high-frequency signals (for example, the above-described noise in a frequency band used by another radio communication method) is not disposed in the bias circuit, it is impossible to remove the noise in this frequency band from the signal line and prevent the noise in this frequency band from entering the power supply line from the signal line using the technique disclosed in Japanese Unexamined Patent Application Publication No. 2010-232988.

Japanese Unexamined Patent Application Publication No. 2011-82809 discloses a technique for preventing a plurality of alternating-current signals in different frequency bands from entering a power supply line from a signal line by adjusting the inductances of inductors connected in series in a bias circuit and the resonant frequency of each series resonator connected between the corresponding inductors to increase impedances in the frequency bands of the alternating-current signals. However, since an inductor is present between the signal line and the series resonator including an inductor and a capacitor, a resonant frequency viewed from the signal line and a resonant frequency viewed from the power supply line differ from each other under the influence of this inductor. It is therefore impossible to remove noise in a frequency band other than the frequency bands of the alternating-current signals (for example, the above-described noise in a frequency band used by another radio communication method) from the signal line and prevent the noise from entering the power supply line from the signal line using the technique disclosed in Japanese Unexamined Patent Application Publication No. 2011-82809.

It is an object of the present disclosure to provide a bias T circuit that is disposed in one of a plurality of radio communication units included in an electronic apparatus and is capable of removing noise in a frequency band used by another of the radio communication units from a signal line and preventing the noise from entering a power supply line from the signal line.

SUMMARY

A bias T circuit according to an embodiment of the present disclosure is disposed in one of a plurality of radio communication units in an electronic apparatus. The bias T circuit includes a plurality of inductors that are disposed between a power supply and a signal line through which a plurality of signals in different frequency bands flow and are connected in series to each other and a filter having attenuation characteristics in a predetermined frequency band used by another of the plurality of radio communication units. One end of the filter is connected between the signal line and one of the plurality of inductors located at a first stage from the signal line.

In a bias T circuit according to an embodiment of the present disclosure, a plurality of series-connected inductors are disposed between a signal line and a power supply. By adjusting the inductances of these inductors, a plurality of signals in different frequency bands flowing through the signal line do not enter the side of the power supply (a power supply line). In particular, since the bias T circuit according to an embodiment of the present disclosure includes a filter having attenuation characteristics in a predetermined frequency band used by another radio communication unit, the filter can attenuate noise flowing through the signal line in the predetermined frequency band. In the bias T circuit according to an embodiment of the present disclosure, since one end of the filter is connected between the signal line and one of the inductors located at a first stage from the signal line, the frequency band in which the filter has attenuation characteristics does not deviate under the influence of the inductors. Using the bias T circuit according to an embodiment of the present disclosure, it is therefore possible to remove noise in the predetermined frequency band used by another radio communication unit from the signal line. It is also possible to prevent noise in the predetermined frequency band from entering the power supply line from the signal line. As a result, it is possible to suppress the effect of noise caused by one radio communication unit upon another radio communication unit.

In the bias T circuit according to an embodiment of the present disclosure, the filter preferably includes a resonant circuit formed of a capacitor and an inductor, and a resonant frequency of the resonant circuit is preferably adjusted to lie within the predetermined frequency band used by the another radio communication unit. Using such a configuration, there can be provided a filter having attenuation characteristics in the predetermined frequency band used by another radio communication unit.

In the bias T circuit according to an embodiment of the present disclosure, the signal line is preferably connected to an input or output side of an amplifier. Using such a configuration, the bias T circuit can superimpose a direct-current component upon a signal (an alternating-current signal) input/output into/from the amplifier.

In the bias T circuit according to an embodiment of the present disclosure, the plurality of radio communication units employ different radio communication methods. Using such a configuration, the bias T circuit included in one radio communication unit can remove noise in the predetermined frequency band used by another radio communication unit employing another radio communication method from the signal line. It is also possible to prevent noise in the predetermined frequency band from entering the power supply line from the signal line.

In the bias T circuit according to an embodiment of the present disclosure, the one radio communication unit employing one of the radio communication methods preferably uses a frequency band higher than the predetermined frequency band used by the another radio communication unit employing another of the radio communication methods, and a signal in the frequency band higher than the predetermined frequency band is preferably generated by combining the plurality of signals in different frequency bands. In particular, in the bias T circuit according to an embodiment of the present disclosure, the one radio communication unit employing the one radio communication method is preferably a WiGig radio communication unit. Using such a configuration, even in a case where noise in the predetermined frequency band occurs in one radio communication unit employing one radio communication method that uses a frequency band higher than the frequency band used by another radio communication unit employing another radio communication method, the bias T circuit included in one radio communication unit can remove the noise from the signal line and prevent the noise from entering the power supply line from the signal line.

In the bias T circuit according to an embodiment of the present disclosure, the another radio communication unit employing the another communication method is preferably a Wi-Fi radio communication unit, and the predetermined frequency band is preferably a 2.4 GHz band and/or a 5 GHz band. Using such a configuration, even in a case where noise in the 2.4 GHz band or the 5 GHz band occurs in one radio communication unit employing one radio communication method, the bias T circuit including the filter having attenuation characteristics in the 2.4 GHz band and/or 5 GHz band can remove the noise from the signal line and prevent the noise from entering the power supply line from the signal line.

According to an embodiment of the present disclosure, there can be provided a bias T circuit that is disposed in one of a plurality of radio communication units included in an electronic apparatus and is capable of removing noise in a frequency band used by another of the radio communication units from a signal line and preventing the noise from entering a power supply line from the signal line.

Other features, elements, characteristics and advantages of the present disclosure will become more apparent from the following detailed description of preferred embodiments of the present disclosure with reference to the attached drawings.

DETAILED DESCRIPTION

Preferred embodiments of the present disclosure will be described in detail below with reference to the accompanying drawings. In the drawings, the same reference numeral is used to represent the same part or a corresponding part so as to avoid repeated explanation.

In this embodiment, an electronic apparatus that performs radio communication using at least the WiGig method (corresponding to one radio communication method) and the Wi-Fi method (corresponding to another radio communication method) is used. In an electronic apparatus according to this embodiment, a bias T circuit according to an embodiment of the present disclosure is included in a radio communication unit employing the WiGig method.

The Wireless Gigabit (WiGig) is one of wireless LAN standards and uses a 60 GHz band. In this embodiment, baseband signals in three different frequency bands are combined to generate a signal in the 60 GHz band (millimeter-wave signal). The Wireless Fidelity (Wi-Fi) is one of wireless LAN standards, and uses a 2.4 GHz band and/or a 5 GHz band.

Figure 1:
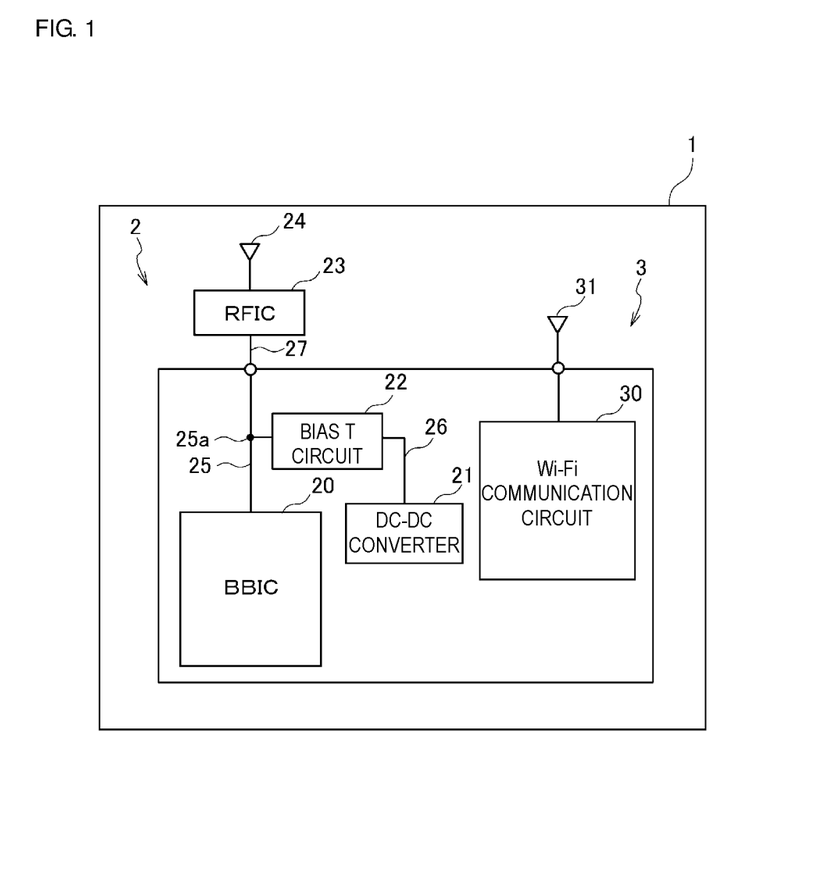
FIG. 1 is a block diagram illustrating, in outline, the configurations of a radio communication unit employing the WiGig method and a radio communication unit employing the Wi-Fi method which are included in an electronic apparatus according to an embodiment of the present disclosure.
Figure 2:
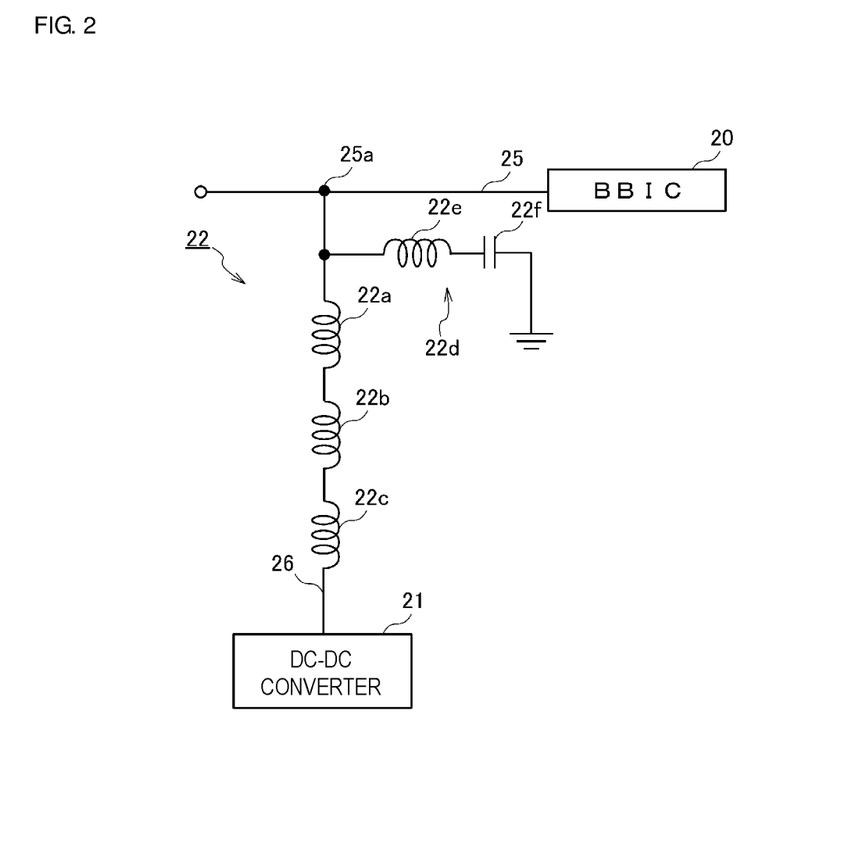
FIG. 2 is a circuit diagram of a bias T circuit according to an embodiment of the present disclosure.

The radio communication function (a radio communication unit 2 employing the WiGig method and a radio communication unit 3 employing the Wi-Fi method) of an electronic apparatus 1 according to an embodiment of the present disclosure will be described with reference to FIGS. 1 and 2. FIG. 1 is a block diagram illustrating, in outline, the configurations of the radio communication unit 2 employing the WiGig method and the radio communication unit 3 employing the Wi-Fi method which are included in the electronic apparatus 1 according to an embodiment of the present disclosure. FIG. 2 is a circuit diagram of a bias T circuit 22 according to an embodiment of the present disclosure.

The electronic apparatus 1 includes the radio communication unit 2 employing the WiGig method (corresponding to a radio communication unit employing one radio communication method) and the radio communication unit 3 employing the Wi-Fi method (corresponding to a radio communication unit employing another radio communication method). The electronic apparatus 1 is, for example, a personal computer. A communication target of the radio communication unit 2 employing the WiGig method (also referred to as the WiGig radio communication unit 2) is, for example, a display. A communication target of the radio communication unit 3 employing the Wi-Fi method (also referred to as the Wi-Fi radio communication unit 3) is, for example, a printer.

First, the radio communication unit 2 will be described. The WiGig radio communication unit 2 employs the IEEE802.11ad as a communication standard. The radio communication unit 2 uses the 60 GHz band. The radio communication unit 2 includes a Base Band Integrated Circuit (BBIC) 20, a DC-DC converter 21 (corresponding to a power supply in Claims), the bias T circuit 22, a Radio Frequency Integrated Circuit (RFIC) 23, and an antenna 24.

The BBIC 20 is an IC for generating baseband signals in a plurality of different frequency bands. For example, the BBIC 20 generates baseband signals in three different frequency bands lower than the 60 GHz band (for example, a predetermined frequency band less than 1 GHz, a predetermined frequency band between 1 and 10 GHz, and a predetermined frequency band greater than 10 GHz). On a substrate on which the BBIC 20 is disposed, a signal line 25 (wiring pattern) through which a plurality of baseband signals flow is formed. The signal line 25 is connected to the BBIC 20.

The DC-DC converter 21 is a direct-current power supply for converting a direct-current voltage into a desired direct-current voltage and outputting the desired direct-current voltage. On a substrate on which the DC-DC converter 21 is disposed, a power supply line 26 (wiring pattern) for supplying a direct-current voltage to the DC-DC converter 21 is formed. The power supply line 26 is connected to the DC-DC converter 21.

The bias T circuit 22 is a circuit for superimposing a direct-current voltage output from the DC-DC converter 21 upon the signal line 25. In particular, the bias T circuit 22 has a noise-control function for controlling noise in a frequency band used by the radio communication unit 3 employing the Wi-Fi method. The bias T circuit 22 is disposed between the signal line 25 and the DC-DC converter 21 (in particular, the power supply line 26 to which the DC-DC converter 21 is connected). As illustrated in FIG. 2, the bias T circuit 22 includes three inductors 22a, 22b, and 22c and a filter 22d.

The inductors 22a, 22b, and 22c are used to prevent baseband signals in three different frequency bands generated in the BBIC 20 from entering the side of the DC-DC converter (the power supply line 26) from the signal line 25. The inductors 22a, 22b, and 22c are disposed between the signal line 25 and the DC-DC converter 21 (the power supply line 26), and are connected in series to each other. The inductors 22a, 22b, and 22c have respective inductances with which impedances are increased in the frequency bands of the three baseband signals.

The filter 22d is used to attenuate (remove) noise in a frequency band used by the radio communication unit 3 employing the Wi-Fi method. The filter 22d has attenuation characteristics in a frequency band used by the radio communication unit 3. The filter 22d is, for example, a series resonant circuit including an inductor 22e and a capacitor 22f connected in series as illustrated in FIG. 2. The resonant frequency (a frequency at which the smallest impedance is obtained) of this series resonant circuit is adjusted to lie within a frequency band (the 2.4 GHz band or the 5 GHz band) used by the radio communication unit 3. In order to obtain this resonant frequency, the inductance of the inductor 22e in the filter 22d and the electrostatic capacity of the capacitor 22f in the filter 22d are set. For example, in a case where a frequency band used by the radio communication unit 3 is the 2.4 GHz band, the inductance of the inductor 22e is set to approximately 3.9 nH and the electrostatic capacity of the capacitor 22f is set to approximately 1.2 pF.

One end of the filter 22d is connected between the signal line 25 (in particular, a node 25a between the signal line 25 and the bias T circuit 22) and the first-stage inductor 22a that is nearest to the signal line 25 of the inductors 22a, 22b, and 22c (including the node 25a of the signal line 25 and one end of the inductor 22a). By connecting the filter 22d to this point, the resonant frequency of the filter 22d is not affected by the inductances of the inductors 22a, 22b, and 22c (the resonant frequency of the filter 22d does not deviate) as viewed from the signal line 25 and the DC-DC converter 21. In particular, it is desired that one end of the filter 22d be connected to the node 25a on the signal line 25. By connecting the filter 22d to this point, the resonant frequency of the filter 22d becomes least susceptible to the inductance of a wiring line. The other end of the filter 22d is connected to the ground.

A band-pass filter may be disposed between the node 25a on the signal line 25 and the BBIC 20. This band-pass filter is, for example, a filter having a passband that passes baseband signals in three different frequency bands generated in the BBIC 20.

The RFIC 23 performs various pieces of processing regarding a plurality of baseband signals and a signal (millimeter-wave signal) of 60 GHz. For example, the RFIC 23 combines baseband signals in three different frequency bands generated in the BBIC 20 to generate a millimeter-wave signal of 60 GHz to be transmitted (to perform modulation). The signal line 25 is connected to the RFIC 23 via a connecting line 27. The WiGig antenna 24 is connected to the RFIC 23. For example, in the RFIC 23, an amplifier for amplifying a baseband signal input from the signal line 25 via the connecting line 27 may be disposed.

The BBIC 20, the DC-DC converter 21, and the bias T circuit 22 are disposed on the same substrate. The signal line 25 and the RFIC 23 disposed on this substrate are connected via the connecting line 27 (for example, a coaxial cable). A direct-current voltage superimposed on the signal line 25 functions as a direct-current power supply for operating the RFIC 23.

Next, the radio communication unit 3 will be described. The radio communication unit 3 employs the Wi-Fi method and is compliant with, for example, one of the IEEE802.11a standard, the IEEE802.11b standard, the IEEE802.11g standard, the IEEE802.11n standard, and the IEEE802.11ac standard. The radio communication unit 3 uses the 2.4 GHz band and/or the 5 GHz band. The radio communication unit 3 includes the Wi-Fi communication circuit 30 and an antenna 31. Since the Wi-Fi communication circuit 30 is a known Wi-Fi radio communication circuit, the detailed description thereof will be omitted. The Wi-Fi communication circuit 30 generates, for example, a signal in the 2.4 GHz band. The Wi-Fi antenna 31 is connected to the Wi-Fi communication circuit 30.

The radio communication unit 3 (the Wi-Fi communication circuit 30 and the antenna 31) is placed near the radio communication unit 2. The Wi-Fi communication circuit 30 may be disposed on the substrate on which the BBIC 20, the DC-DC converter 21, and the bias T circuit 22, which are included in the radio communication unit 2, are disposed. Since the radio communication unit 3 is placed near the radio communication unit 2, the radio communication unit 3 may be affected by noise caused by the radio communication unit 2. For example, in a case where noise emitted from the connecting line 27 that connects the signal line 25 and the RFIC 23 in the radio communication unit 2 is received by the antenna 31 in the radio communication unit 3 or noise on the power supply line 26 in the radio communication unit 2 is transmitted to a power supply unit in the radio communication unit 3, the radio communication unit 3 may be affected by the noise.

In the radio communication unit 2 in particular that uses a frequency band higher than that of the radio communication unit 3, in a case where noise in the 2.4 GHz band and/or the 5 GHz band used by the radio communication unit 3 occurs, the radio communication quality of the radio communication unit 3 may be deteriorated under the influence of the noise in this frequency band. In order to suppress such self-poisoning in the electronic apparatus 1, the bias T circuit 22 having the above-described noise control function is disposed in the radio communication unit 2.

The bias T circuit 22 includes the filter 22d having attenuation characteristics in the frequency band used by the radio communication unit 3 for the purpose of noise control. One end of the filter 22d is connected between the signal line 25 and the first-stage inductor 22a. The effect of the noise control function of the bias T circuit 22 will be described.

In a case where noise in the frequency band (for example, the 2.4 GHz band) used by the radio communication unit 3 enters the signal line 25, the impedance of the filter 22d becomes the lowest in this frequency band because the resonant frequency of the filter 22d is adjusted to lie within the frequency band used by the radio communication unit 3. When noise in this frequency band enters the bias T circuit 22 from the node 25a on the signal line 25, the noise is therefore transmitted to the filter 22d and is then transmitted to the ground via the filter 22d.

Thus, the noise in the frequency band used by the radio communication unit 3 can be removed from the signal line 25. As a result, the noise in the frequency band used by the radio communication unit 3 is difficult to be transmitted (or is never transmitted) to the side of the RFIC 23 from the node 25a on the signal line 25. The noise in the frequency band used by the radio communication unit 3 is difficult to be transmitted (or is never transmitted) to the side of the DC-DC converter 21 (the power supply line 26).

Since one end of the filter 22d is connected between the signal line 25 and the first-stage inductor 22a, the resonant frequency of the filter 22d is not affected by the inductors 22a, 22b, and 22c. The resonant frequency of the filter 22d is not therefore changed as viewed from both of the signal line 25 and the DC-DC converter 21 (the power supply line 26). Accordingly, at both of the signal line 25 and the power supply line 26 (the side of the DC-DC converter 21), the noise in the frequency band used by the radio communication unit 3 can be effectively attenuated.

Figure 3:
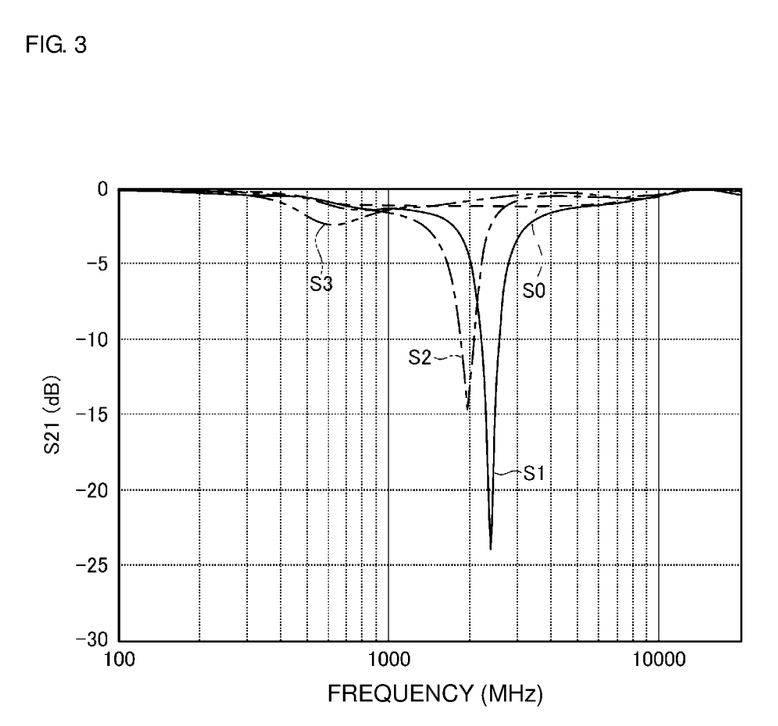
FIG. 3 is a diagram illustrating exemplary S21 characteristics of noise that passes through a signal line.

FIG. 3 illustrates exemplary attenuation characteristics of noise transmitted through the signal line 25 in a case where the bias T circuit 22 is used. Next, the effect of the bias T circuit 22 will be described with reference to FIG. 3. The attenuation characteristics of three bias T circuits that are comparative examples having different configurations are also illustrated. FIG. 3 is a diagram illustrating exemplary S21 characteristics for noise transmitted through the signal line 25. In FIG. 3, a horizontal axis represents frequency (MHz) and a vertical axis represents S21 (dB).

A section of the signal line 25 between the node 25a and the BBIC 20 is defined as Port1, and a section of the signal line 25 between the node 25a and the RFIC 23 is defined as Port2. S21 represents attenuation characteristics of noise transmitted from Port1 to Port2 on the signal line 25. The smaller the value of S21, the larger the amount of attenuation (the noise is difficult to be transmitted from Port1 to Port2 on the signal line 25). On the other hand, the larger the value of S21 (the closer to 0 dB), the smaller the amount of attenuation (the noise is easily transmitted from Port1 to Port2 on the signal line 25).

One of three bias T circuits that are comparative examples has a configuration in which the filter 22d is not included (only the three stages of the inductors 22a, 22b, and 22c are included), one of them has a configuration in which one end of a filter having the same configuration as the filter 22d is connected between the first-stage inductor 22a and the second-stage inductor 22b, and one of them has a configuration in which one end of a filter having the same configuration as the filter 22d is connected between the second-stage inductor 22b and the third-stage inductor 22c. In this example, the filter 22d includes the inductor 22e having the inductance of approximately 3.9 nH and the capacitor 22f having the electrostatic capacity of approximately 1.2 pF, and has the resonant frequency of approximately 2.4 GHz.

Referring to FIG. 3, a solid line S1 indicates attenuation characteristics in a case where the bias T circuit according to an embodiment of the present disclosure is used, a broken line S0 indicates attenuation characteristics in a case where the bias T circuit not including the filter 22d is used, a dot-and-dash line S2 indicates attenuation characteristics in a case where a bias T circuit including a filter connected between the first-stage inductor 22a and the second-stage inductor 22b is used, and a two-dot chain line S3 indicates attenuation characteristics in a case where a bias T circuit including a filter connected between the second-stage inductor 22b and the third-stage inductor 22c is used.

In a case where the bias T circuit 22 according to an embodiment of the present disclosure is used, the value of S21 is the smallest in the 2.4 GHz band and high attenuation characteristics are obtained in the 2.4 GHz band as indicated by S1. Noise is therefore most attenuated in the 2.4 GHz band and 2.4 GHz-band noise is difficult to be transmitted from Port1 to Port2 on the signal line 25. In a frequency band other than the 2.4 GHz band, S21 decreases. In the frequency band other than the 2.4 GHz band, noise (or a signal) is difficult to be attenuated and is easily transmitted from Port1 to Port2 on the signal line 25.

In a case where a bias T circuit including no filter is used, the value of S21 is not small (is close to 0 dB) as indicated by S0. Noise (or a signal) is hardly attenuated and is easily transmitted from Port1 to Port2 on the signal line 25.

In a case where a bias T circuit including a filter connected between the first-stage inductor 22a and the second-stage inductor 22b is used, high attenuation characteristics are obtained in a frequency band (around 2 GHz) lower than the 2.4 GHz band as indicated by S2. In this case, noise is attenuated in this low frequency band and the noise in the low frequency band is difficult to be transmitted from Port1 to Port2 on the signal line 25. However, 2.4 GHz-band noise is easily transmitted from Port1 to Port2 on the signal line 25. Since the inductor 22a is located between the filter and the signal line 25 in this comparative example, the resonant frequency of the filter deviates from 2.4 GHz under the influence of the inductor 22a and high attenuation characteristics are obtained in a frequency band lower than the 2.4 GHz band.

In a case where a bias T circuit including a filter connected between the second-stage inductor 22b and the third-stage inductor 22c is used, noise (or a signal) is hardly attenuated and 2.4 GHz-band noise is easily transmitted from Port1 to Port2 on the signal line 25 as indicated by S3.

As is apparent from FIG. 3, in a case where the bias T circuit 22 according to an embodiment of the present disclosure is used, 2.4 GHz-band noise can be effectively attenuated (removed) on the signal line 25 and is difficult to be transmitted through the signal line 25 as compared with cases where no filter is included, a filter is connected between the inductors 22a and 22b, and a filter is connected between the inductors 22b and 22c. In order to obtain this effect, it is necessary to connect one end of the filter 22d having attenuation characteristics in the 2.4 GHz band between the signal line 25 and the first-stage inductor 22a.

Figure 4:
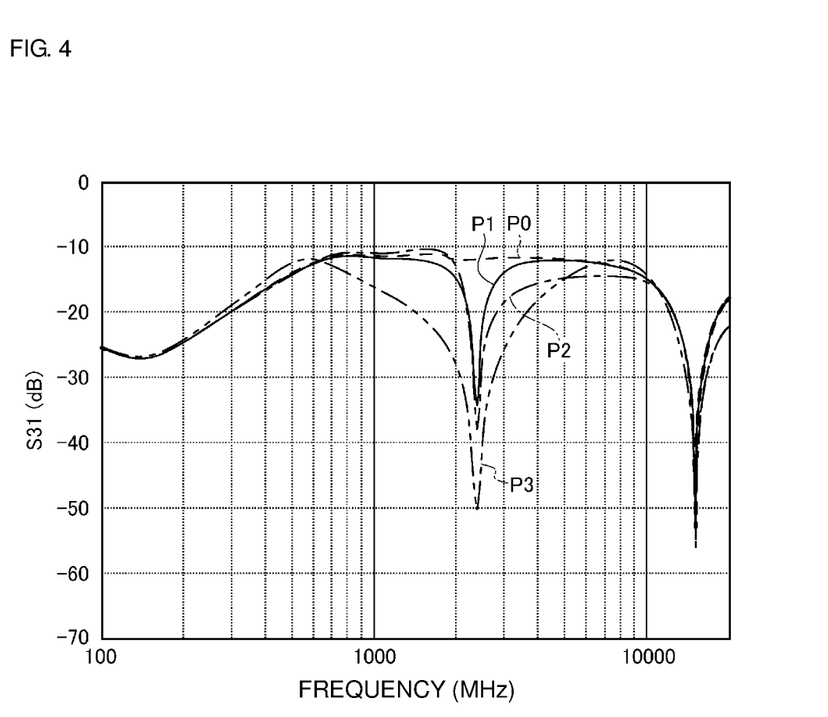
FIG. 4 is a diagram illustrating exemplary S31 characteristics of noise that enters a power supply line from a signal line.

FIG. 4 illustrates exemplary attenuation characteristics of noise that enters the power supply line 26 (the side of the DC-DC converter 21) from the signal line 25 in a case where the bias T circuit 22 is used. Next, another effect of the bias T circuit 22 will be described with reference to FIG. 4. The attenuation characteristics of three bias T circuits that are comparative examples having different configurations are also illustrated. FIG. 4 is a diagram illustrating exemplary S31 characteristics for noise that enters the power supply line 26 from the signal line 25. In FIG. 4, a horizontal axis represents frequency (MHz) and a vertical axis represents S31 (dB). The three bias T circuits that are comparative examples are the same as the above three bias T circuits used to describe attenuation characteristics of noise transmitted through a signal line.

A section of the signal line 25 between the node 25a and the BBIC 20 is defined as Port1, and a section of the signal line 25 between the node 25a and the DC-DC converter 21 (the power supply line 26) is defined as Port3. S31 represents attenuation characteristics of noise transmitted from Port1 on the signal line 25 to Port3 on the signal line 26. The smaller the value of S31, the larger the amount of attenuation (the noise is difficult to be transmitted from the signal line 25 to the power supply line 26 (the side of the DC-DC converter 21). On the other hand, the larger the value of S31 (the closer to 0 dB), the smaller the amount of attenuation (the noise is easily transmitted from the signal line 25 to the power supply line 26).

Referring to FIG. 4, a solid line P1 indicates attenuation characteristics in a case where the bias T circuit according to an embodiment of the present disclosure is used, a broken line P0 indicates attenuation characteristics in a case where the bias T circuit including no filter is used, a dot-and-dash line P2 indicates attenuation characteristics in a case where a bias T circuit including a filter connected between the first-stage inductor 22a and the second-stage inductor 22b is used, and a two-dot chain line P3 indicates attenuation characteristics in a case where a bias T circuit including a filter connected between the second-stage inductor 22b and the third-stage inductor 22c is used.

In a case where the bias T circuit 22 according to an embodiment of the present disclosure is used, the value of S31 is small in the 2.4 GHz band and high attenuation characteristics are obtained in the 2.4 GHz band as indicated by P1. Noise is therefore attenuated in the 2.4 GHz band and 2.4 GHz-band noise is difficult to be transmitted from the signal line 25 to the power supply line 26 (the side of the DC-DC converter 21).

In a case where a bias T circuit including no filter is used, the value of S31 is not small in the 2.4 GHz band as indicated by P0. Noise is not attenuated in the 2.4 GHz band and 2.4 GHz-band noise is easily transmitted from signal line 25 to the power supply line 26.

In a case where a bias T circuit including a filter connected between the first-stage inductor 22a and the second-stage inductor 22b is used, high attenuation characteristics are obtained in the 2.4 GHz band as indicated by P2. In a case where a bias T circuit including the filter 22d connected between the second-stage inductor 22b and the third-stage inductor 22c is used, high attenuation characteristics are also obtained in the 2.4 GHz band as indicated by P3. Noise is therefore attenuated in the 2.4 GHz band, and 2.4 GHz-band noise is difficult to be transmitted from the signal line 25 to the power supply line 26. In these comparative examples, the resonant frequency of a filter is not changed from the resonant frequency obtained in a case where the bias T circuit according to an embodiment of the present disclosure is used as viewed from Port3 (the DC-DC converter 21). Like in the case where the bias T circuit 22 according to an embodiment of the present disclosure is used, high attenuation characteristics are obtained in the 2.4 GHz band.

As is apparent from FIG. 4, unlike a bias T circuit including no filter, the bias T circuit 22 according to an embodiment of the present disclosure can prevent 2.4 GHz-band noise from entering the power supply line 26 (the side of the DC-DC converter 21) from the signal line 25. In order to obtain this effect, it is necessary to dispose the filter 22d having attenuation characteristics in the 2.4 GHz band in the bias T circuit 22.

Using the bias T circuit 22 according to an embodiment of the present disclosure, it is possible to remove noise in a frequency band used by the Wi-Fi radio communication unit 3 from the signal line 25 by connecting one end of the filter 22d having attenuation characteristics in the frequency band used by the radio communication unit 3 between the signal line 25 and the first-stage inductor 22a. In addition, it is also possible to prevent the noise in the frequency band from entering the power supply line 26 (the side of the DC-DC converter 21) from the signal line 25. As a result, it is possible to suppress the effect of noise caused by the radio communication unit 2 employing the WiGig method upon the radio communication unit 3 employing the Wi-Fi method.

Using the bias T circuit 22 according to an embodiment of the present disclosure, it is possible to form the filter 22d having attenuation characteristics in a frequency band used by the radio communication unit 3 with a simple circuit by forming a series resonant circuit with the inductor 22e and the capacitor 22f and adjusting the resonant frequency of this series resonant circuit to lie within the frequency band used by the radio communication unit 3.

Although embodiments of the present disclosure have been described, the present disclosure is not limited to the embodiments and various modifications may be made to the embodiments. For example, although the electronic apparatus 1 employing the WiGig method and the Wi-Fi method is used in the above-described embodiments, an electronic apparatus employing another radio communication method such as the Bluetooth (registered trademark) may be used.

Although the filter 22d having attenuation characteristics (a single resonant frequency) in a single frequency band is disposed in the bias T circuit 22 in the above-described embodiments, a filter having attenuation characteristics (a plurality of resonant frequencies) in a plurality of frequency bands may be used in a case where another radio communication unit employing another radio communication method uses these frequency bands.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A bias T circuit that is disposed in one of a plurality of radio communication units in an electronic apparatus comprising:

a plurality of inductors that are disposed between a power supply and a signal line through which a plurality of signals in different frequency bands generated in and transmitted from a Base Band Integrated Circuit (BBIC) flow and are connected in series to each other, the plurality of signals in the different frequency bands being configured to be combined to generate a 60 GHz-band WiGig signal; and a filter having attenuation characteristics in a predetermined frequency band used by another of the plurality of radio communication units, wherein one end of the filter is connected between the signal line and one of the plurality of inductors located at a first stage from the signal line, the plurality of radio communication units employ different radio communication methods, the one radio communication unit employing one of the radio communication methods uses a frequency band higher than the predetermined frequency band used by another radio communication unit employing another of the radio communication methods, a signal in the frequency band higher than the predetermined frequency band is the 60 GHz-band WiGig signal and is generated by combining the plurality of signals in different frequency bands, and the plurality of inductors have respective inductances, each of the inductances is configured to prevent a signal having one of the different frequency bands from entering into the power supply.

2. The bias T circuit according to claim 1, wherein the filter includes a resonant circuit formed of a capacitor and an inductor, and wherein a resonant frequency of the resonant circuit is adjusted to lie within the predetermined frequency band used by another radio communication unit.

3. The bias T circuit according to claim 1, wherein the signal line is connected to an input or output side of an amplifier.

4. The bias T circuit according to claim 1, wherein the one radio communication unit employing the one radio communication method is a WiGig radio communication unit.

5. The bias T circuit according to claim 1, wherein another radio communication unit employing another communication method is a Wi-Fi radio communication unit, and wherein the predetermined frequency band is at least one of a 2.4 GHz band and a 5 GHz band.

* * * * *